(12) United States Patent
Morris (10) Patent No.: US 6,481,059 B2
(45) Date of Patent: Nov. 19, 2002

(54) HAT FASTENERS FOR EYE GLASSES

(75) Inventor: Russell Morris, 650 Crescent Blvd., S.W. Calgary (CA), T2S 1L2

(73) Assignee: Russell Morris, Calgary (CA)

( * ) Notice: Subject to any disclaimer, the term of this patent is extended or adjusted under 35 U.S.C. 154(b) by 0 days.

(21) Appl. No.: 09/733,125

(22) Filed: Dec. 8, 2000

(65) Prior Publication Data

US 2002/0069488 A1 Jun. 13, 2002

(51) Int. Cl.[7] ............................................. A44B 21/00
(52) U.S. Cl. ............................ 24/3.12; 24/3.3; 24/336
(58) Field of Search ......................... 24/3.3, 3.11, 3.12, 24/3.1, 336, 545, 546, 555–557, 560–563; 2/10; 351/155

(56) References Cited

U.S. PATENT DOCUMENTS

| | | | | |
|---|---|---|---|---|
| 2,802,250 A | * | 8/1957 | Klotz | |
| 3,983,602 A | * | 10/1976 | Barry | |
| 4,276,657 A | * | 7/1981 | Montesi | |
| 4,768,231 A | * | 9/1988 | Schrack | |
| 5,123,724 A | | 6/1992 | Salk | ............................ 351/57 |
| 5,408,728 A | * | 4/1995 | Wisniewski | |
| 5,794,312 A | * | 8/1998 | O'Mahony | |
| 5,829,103 A | * | 11/1998 | Allen | |
| 5,845,369 A | | 12/1998 | Dunchock | ..................... 24/3.3 |
| 5,867,874 A | * | 2/1999 | Simpson | |
| 5,903,928 A | * | 5/1999 | Hyung-Seob | |
| 5,940,890 A | * | 8/1999 | Dallas et al. | |
| 6,134,753 A | * | 10/2000 | O'Mahony | |
| 6,185,748 B1 | * | 2/2001 | DeChambeau | |
| 6,210,003 B1 | * | 4/2001 | Chan | |

* cited by examiner

Primary Examiner—James R. Brittain
(74) Attorney, Agent, or Firm—Buskop Law Group, P.C.; Wendy Buskop (57) ABSTRACT

Safety glasses holders and eye glass holders for securing to hats or fabric comprising a wedge shaped design, a clip on design and a fastening design, wherein said fastening design comprises a frame secured to the insides of a hat, a first and second elastic cord or pin penetrating said hat and secured to said frame, and a strip disposed between said first and second elastic cords or pins for holding the arm of a pair of safety glasses.

16 Claims, 13 Drawing Sheets

Figure 13

HAT FASTENERS FOR EYE GLASSES

FIELD OF THE INVENTION

The present invention relates to eyeglass holders and, in particular, safety glass holders, sunglass holders and clear eyeglass holders adapted to secure to a hat or clothing of a user.

BACKGROUND OF THE INVENTION

Safety is a paramount issue in refineries and chemical plants, oil field rig sites or other industrial sites. Most plants require their employees to wear safety glasses during work time, particularly if they are outside of a building. Problems have developed in where to put safety glasses, when not in use, while keeping them handy for instantaneous use. The present invention has been created to save the eyes and health of the many refinery and chemical plant workers, other heavy industry workers and also has use in the recreational sports area.

Millions of people wear eyeglasses and sunglasses everyday. However, many of them remove their eyeglasses during the course of the day for various reasons, when they come inside from the sun, when they enter a tunnel, or come into a dark place. In some cases, individuals remove their eyeglasses to perform other activities because they need glasses only to read, and not see distance. In each case, the user requires a place to hold or store the eyeglasses when they are not used.

While safety glasses are very bulky and difficult to store, normal sunglass cases are commonly available, as are chains or strings which move about the head or neck of a user and hold the eyeglasses when they are removed from the user's head. As chains are fully functional to store or hold eyeglasses when not in use, they frequently suffer from practical or aesthetic shortcomings that limit their use. Individuals who desire to skate board, ski or do other sports, frequently, do not choose to carry eye glass cases, and may, for safety reasons, prefer not to use sun glass chains or braided ropes. Safety glasses are usually too heavy to be supported by such strings, particularly of the safety glasses are prescription glasses. Various improvisations may be made to hold and support eyeglasses when not in use, though they frequently suffer from an inability to secure the glasses, or are aesthetically undesirable to trendy users.

The present invention addresses these and other deficiencies associated with the problems of holding safety glasses on an employee's person yet keeping the glasses really handy for instantaneous use in case of a chemical excursion or other problems which does not enable an employee time to get the glasses out of a case or other container. In addition, the present invention provides a strong support which is trending for contemporary eye glass and sunglass users. The present invention provides three versions of a device for securing eyeglasses against dislodgment by an active user, while providing an aesthetically pleasing construction that can appear as an ornamental feature for a hat or article of clothing.

When in use, the construction of the present invention allows the glass holder to serve its intended function, without detracting from the appearance of the hat to which it is attached. More specifically, the present invention is directed to an eye glass holder which, when in use, distributes the load of the glasses over a broader area of a hat to avoid or mitigate the eyeglasses from weighting the hat in an unbalanced manner.

These and other advantages of the invention are described in more detail below in conjunction with the presently preferred embodiment of the invention.

SUMMARY OF THE INVENTION

A safety glasses or similar eye glass holder is disclosed for personal use which is attachable to an individual's hat or an article of fabric, or clothing, for supporting and securing a pair of safety glasses, sun glasses or similar eye glasses. The holder preferably comprises a clip or fastener having one of three fundamental designs which is engageable with a hat or fabric or an article of clothing. The holder extends from the hat and is in one version is permanently affixed to the hat, and in another version is removably affixed to the hat. In each case, the holders engage the arm of the safety or eyeglasses.

The eye glass fastener, for the non-removable version is preferably formed as a substantially planar circular member, fabricated of resilient plastic material or light weight metal alloy, a composite, a laminate or combinations thereof. The fastener has a diameter of approximately one-third inch. In the presently preferred embodiment the clip formed to have a length of approximately one half to two inches long and is preferably 1½ inches long. The clip may be longer than 2 inches for hats which are very large and cumbersome, such as hard hats. The preferred clip has a length of approximately 0.5 inches. As an option, an elastic cord can be used as well to assist in holding the arm of the eyeglasses.

Any of the three versions of the eye glass fastener may be formed from plastic, a light weight metal alloy or be a laminated material and which has a thickness of between 0.005–0.5 inches. In a preferred embodiment the fasteners are made from material that is approximately 0.005 inches thick.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth functions and construction of the invention in connection with the illustrated embodiment. It is to be understood, however, that the same or equivalent functions may be accomplished by different embodiments that are also intended to be accomplished within the spirit and scope of the invention.

The present invention involves three basic fastening designs, the clip design, the wedge design and the fastened holder design. All can be used with safety glasses and attachable to soft hats or hard hats for making safety glasses easily and instantaneously available thereby preventing injury to an employee.

I. The Clip

Figure 1:
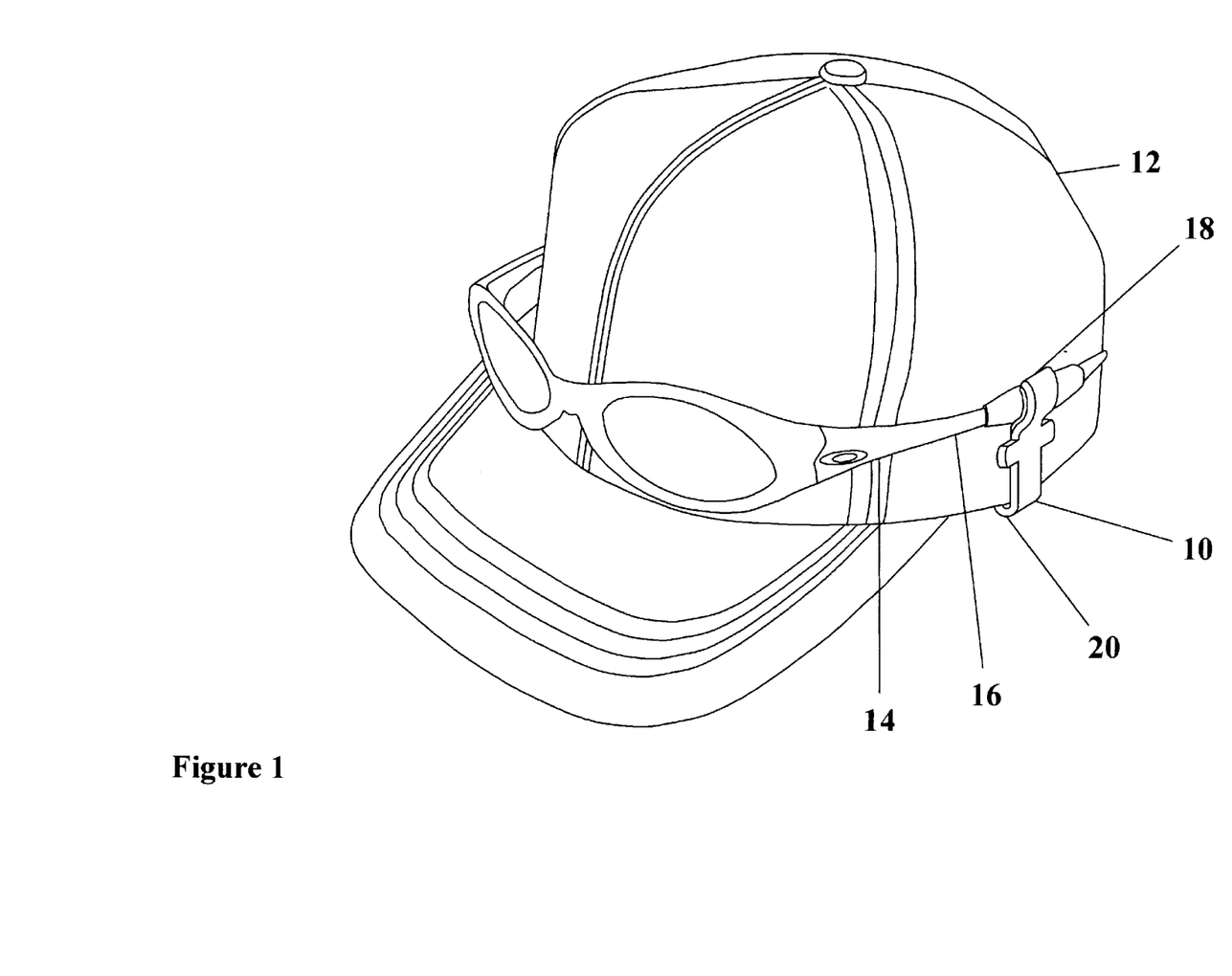
FIG. 1 is a perspective view showing the clip embodiment of the invention supporting sunglasses on a hat.

FIG. 1 generally illustrates the arrangement of a clip 10 disposed upon a hat 12 for holding safety or other types of eye glasses 14, which includes sun glasses. Many types of hats could be used with the clip design with the exception of cowboy hats or hats which have a brim that totally covers the head. For hats with a brim that totally covers the head, such as a cowboy hat, then the fastened holder design would work within the scope of the present invention. The non-removable design, the fastened holder design, also would work well with hard hats.

The clip 10 supports eyeglasses 14 whereby the eyeglass arm 16 is held into place by the clip 10 at the clip top 18. A U shaped securing piece 20 holds the clip top 18 to the hat 12.

Figure 2:
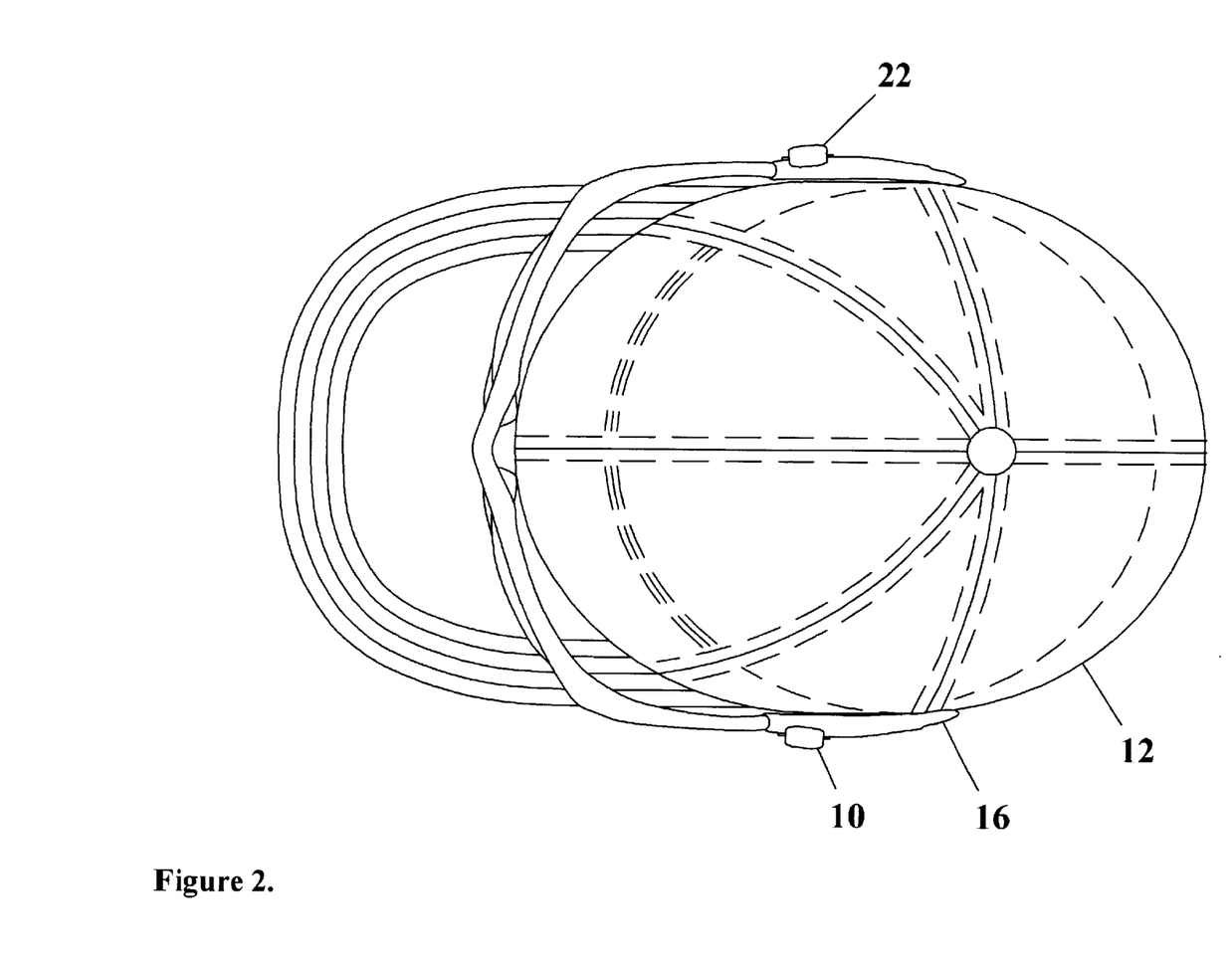
FIG. 2 is a top view of the construction shown in FIG. 1.

FIG. 2 provides a top view of the clip 10 holding arm 16 against the hat 12 while the hat is on the head of the wearer. At least one clip 10 is needed to hold the glasses to the hat and two are preferred, 10 and 22.

Figure 3:
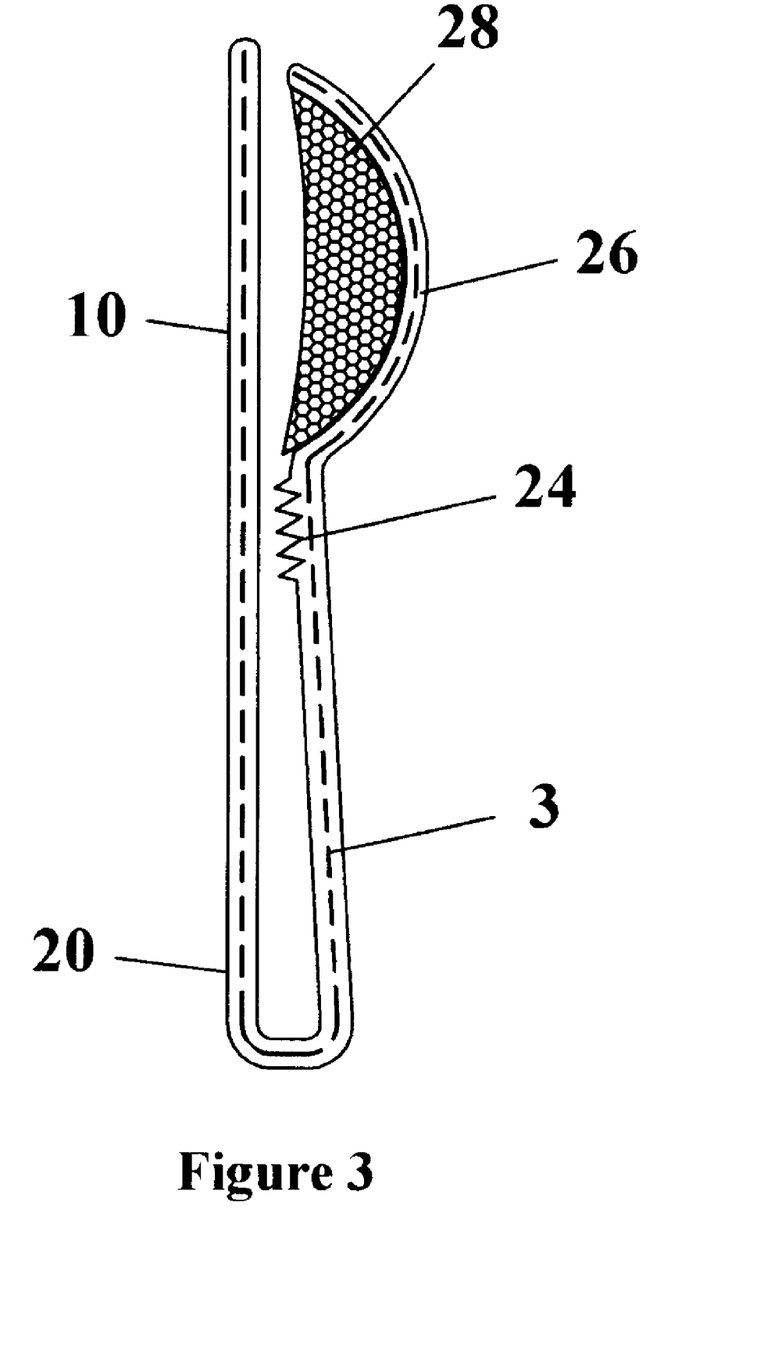
FIG. 3 is a detailed view of the clip of FIG. 1 without the eyeglasses.
Figure 4:
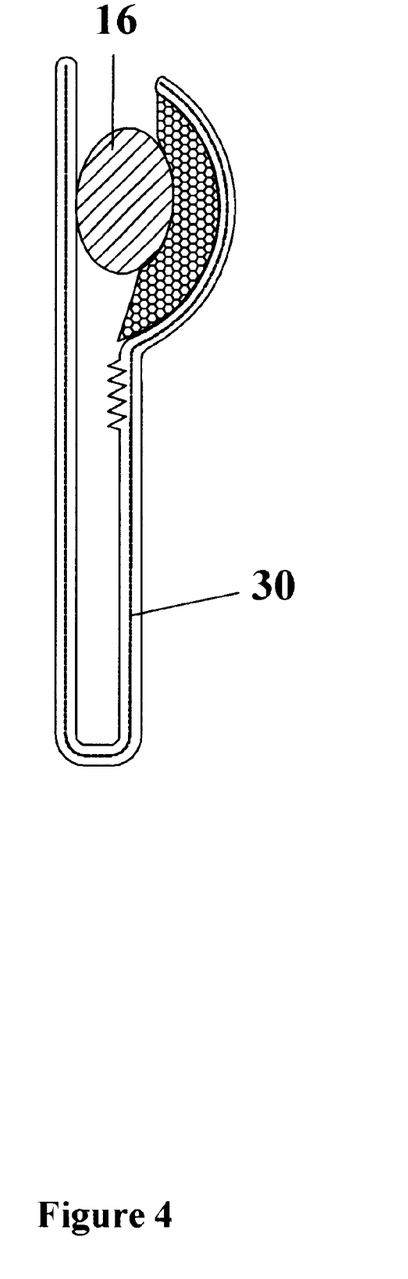
FIG. 4 is a side view of the clip of FIG. 1 holding the arm of eyeglasses.
Figure 5:
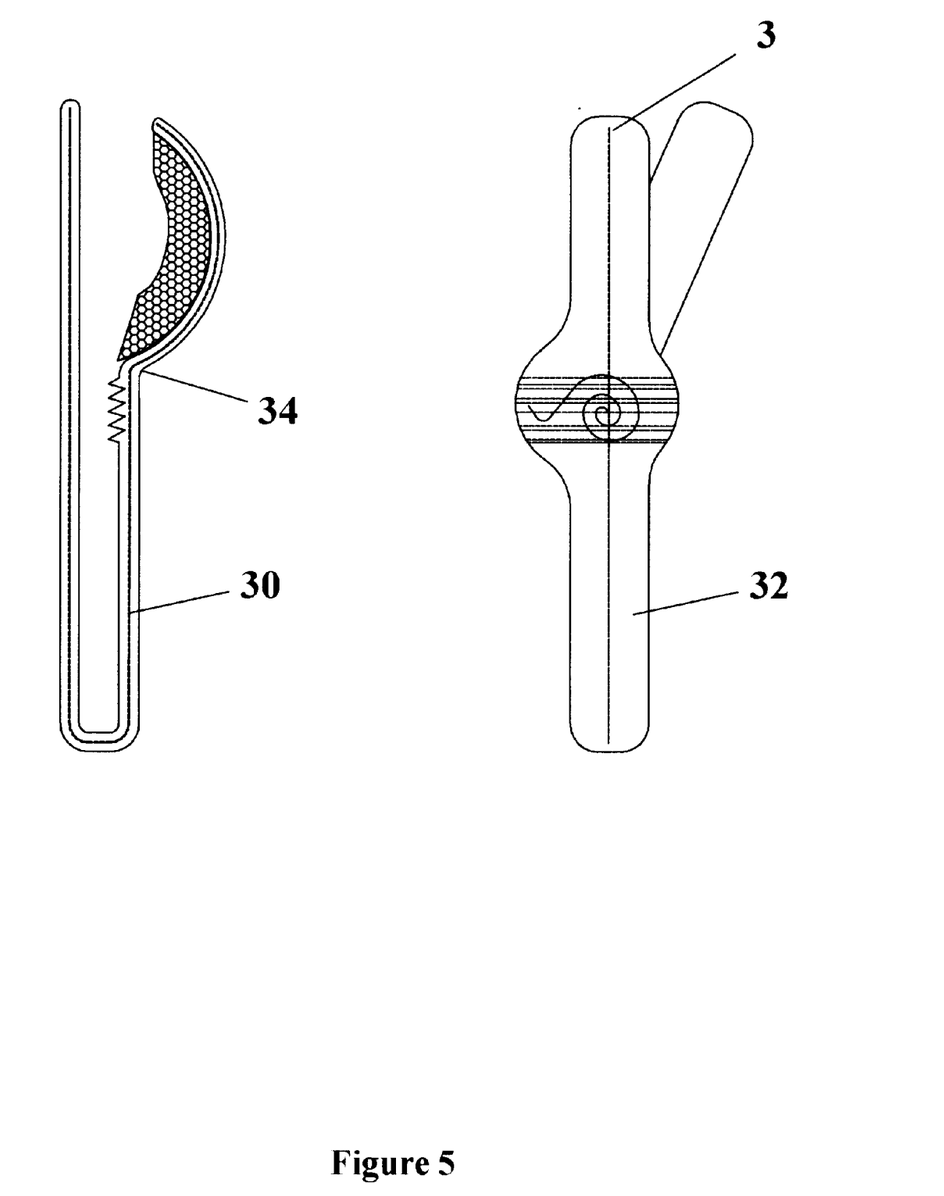
FIG. 5 is a front view of the clip.

FIGS. 3, 4 and 5 shows detailed view of the clip 10, taken from the side and front perspectives. FIG. 3 shows the clip 10 having the U shaped securing piece 20, serrated teeth 24 making a secure connection to the hat. A C shaped holder element 26 is used to secure the sun glass arm, and a soft foam or plastic insert 28 is additionally and optionally used to contact to the sunglass arm 16. FIG. 4 shows the arm 16 held in place by the soft foam or plastic insert 28. A preformed internal wire 30 is shown in FIGS. 3, 4 and 5 for resiliently engaging said clip elements together.

As shown at FIG. 5 the clip 10 includes a substantially planar member 32 for securing to the inside of the hat and smoothly sliding against the head. A hinge 34 enables the clip to move away from the hat to engage the arm of the eyeglasses.

II. The Wedge Shaped Clip

Figure 6:
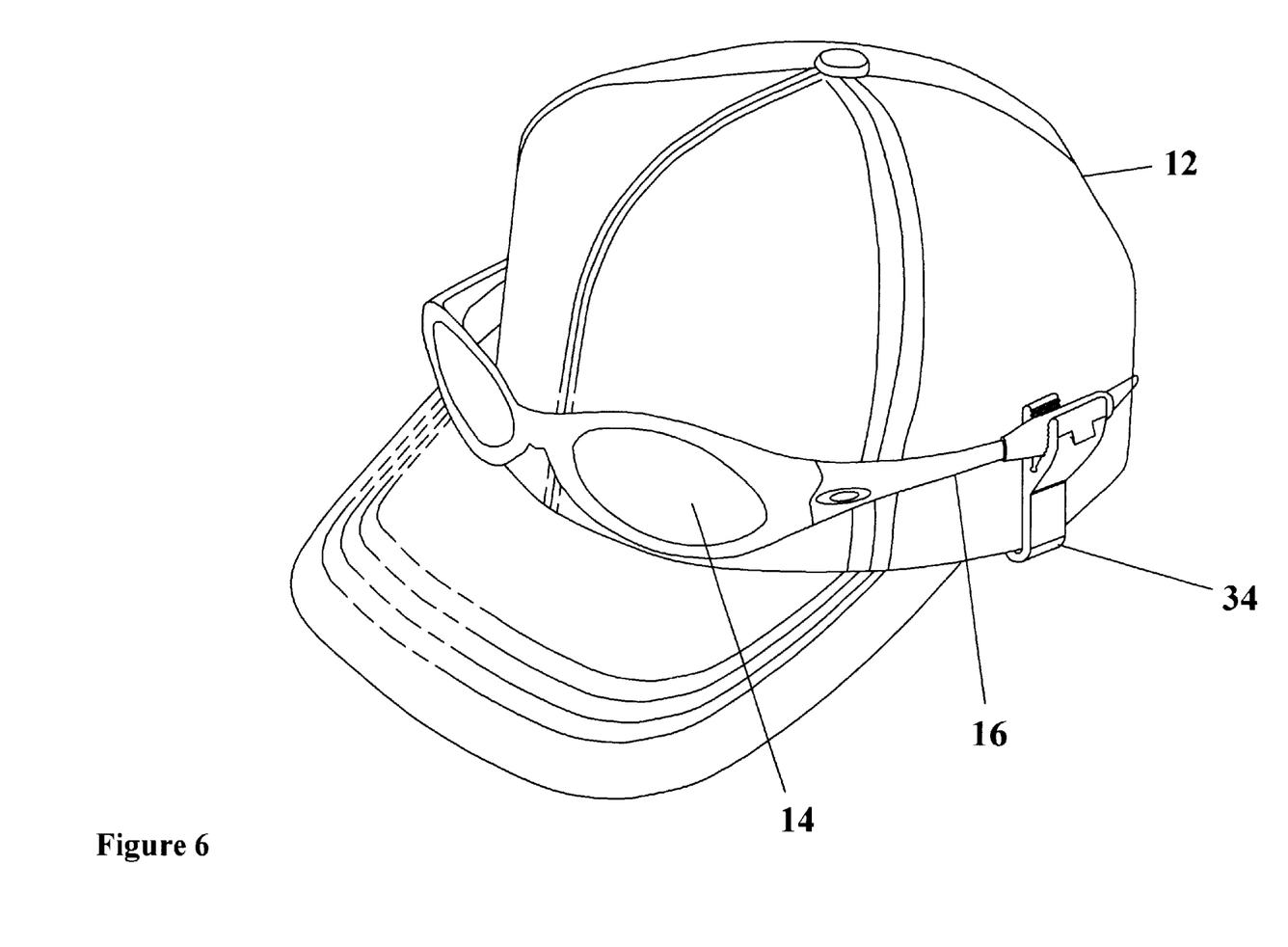
FIG. 6 is a perspective view of a wedge shaped clip of the invention supporting eyeglasses on a hat.

In the second embodiment of the invention, shown as FIG. 6, the hat 12 has wedge shaped clip 34 for engaging the arm 16 of glasses 14.

Figure 7:
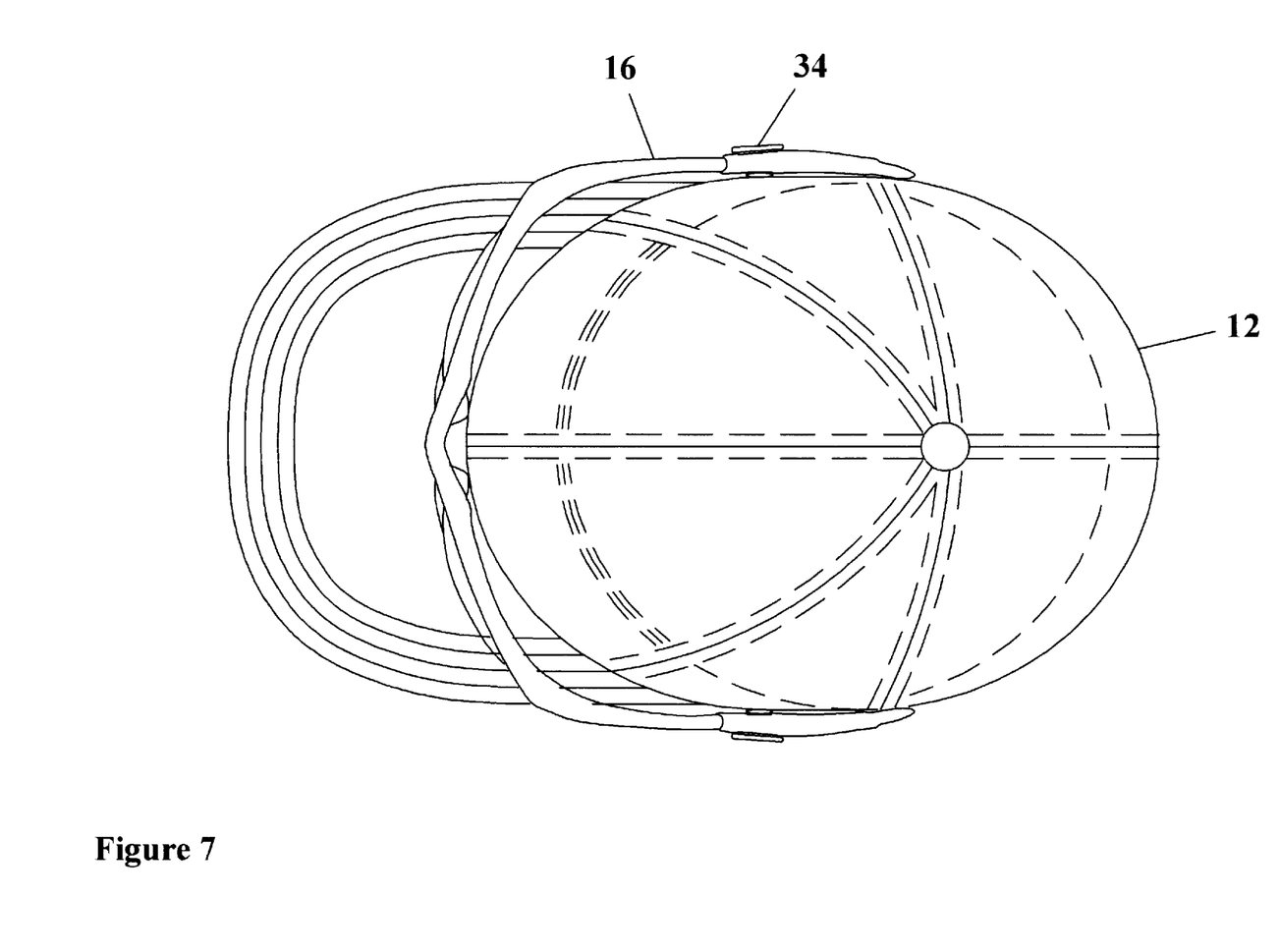
FIG. 7 is a top view of the embodiment of FIG. 6.

FIG. 7 shows a top view of the embodiment of FIG. 6, wherein the hat 12 has a wedge shaped clip 34 for holding arm 16 on two sides of the arm.

As will be apparent to those of ordinary skill in the art, that the clip be preferably formed of resilient plastic material that is sufficiently stiff to resiliently support to provide resilient lateral support to the hat upon engagement of the eye glasses to the clip. It is contemplated to be within the scope of the invention to have the clip made from a lightweight metal alloy, or composite of plastic and metal alloy. However, the clip needs to be sufficiently deformable to resiliently distribute the load of the eye glass arm to the hat. This load distribution mechanism mitigates stretching or pulling of the hat about the clip, and mitigates an unbalanced load situation about the hat. It is also contemplated that an elastic cord can be used to hold the arm of the eyeglasses and remain within the scope of the invention, in place of the fastener.

In the presently preferred embodiment the wedge shaped clip is constructed such that the clip top width of approximately 0.5 inches.

Figure 8:
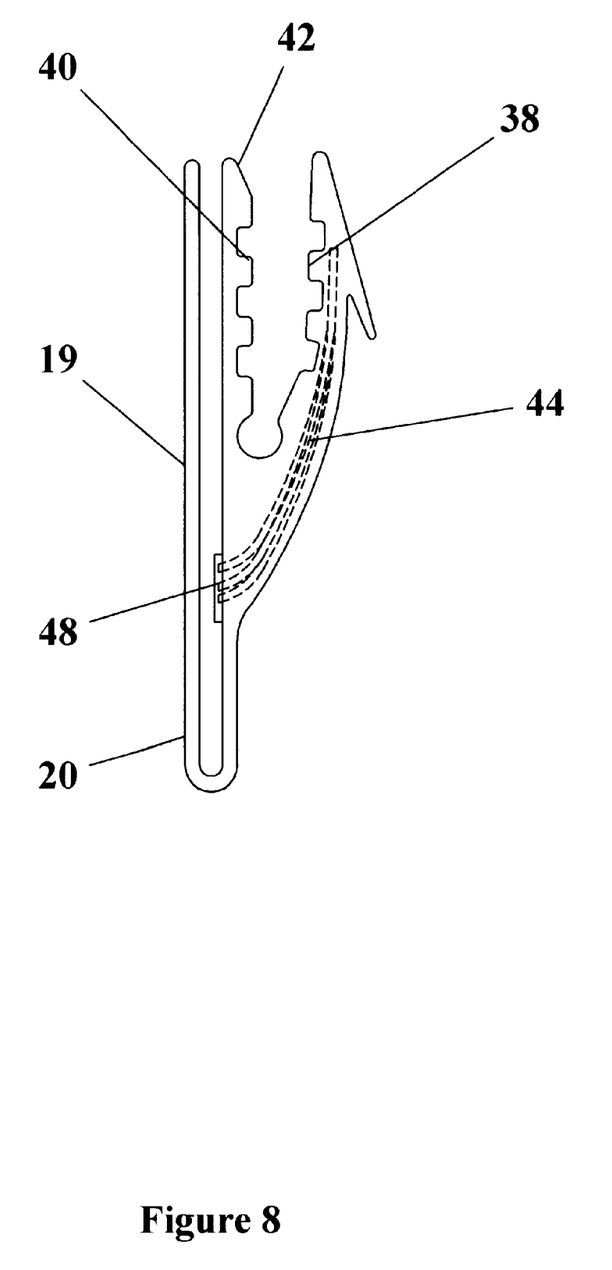
FIG. 8 is a side view of the wedge shaped clip of FIG. 6 without glasses attached.

FIG. 8 shows a side view of the wedge shaped clip of the invention. The wedge shaped clip has a planar member 19 for fitting smoothly inside a hat, and connected to the planar member, is a U shaped securing piece 20 extending normally from the planar member 19 forming an apparatus for engaging the hat material. The U shaped securing piece 20 is connected to a V-shaped member 42 extending from the U shaped member, wherein the V shaped member 42 having a pair of serrated teeth, 38 and 40.

Figure 9:
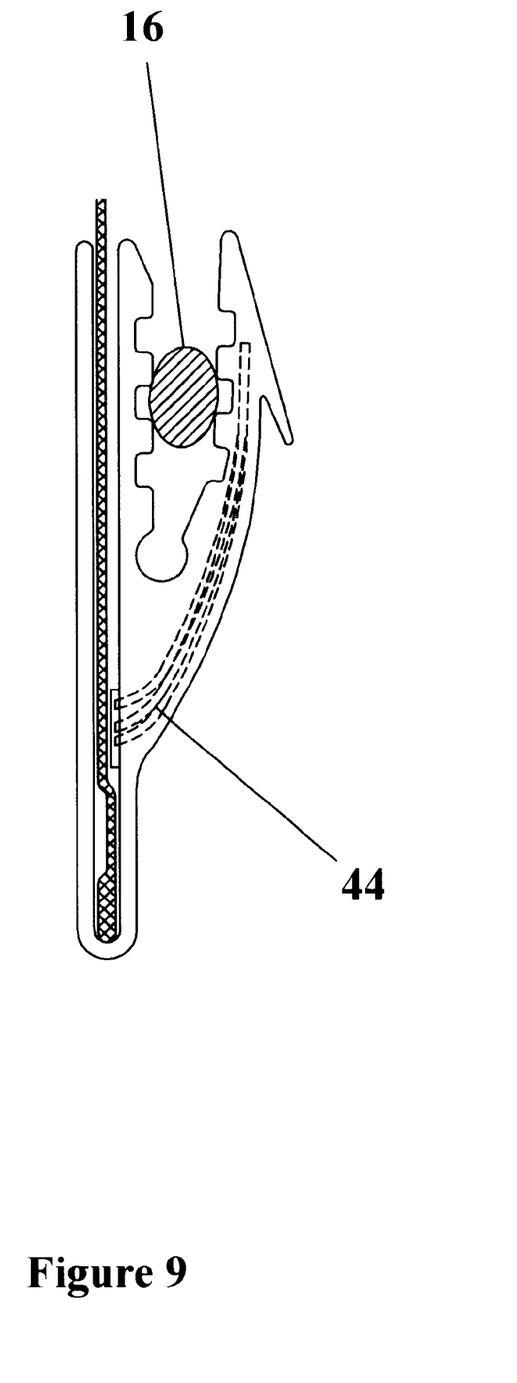
FIG. 9 is a side view of the wedge shaped clip of FIG. 6 with the glasses secured.
Figure 10:
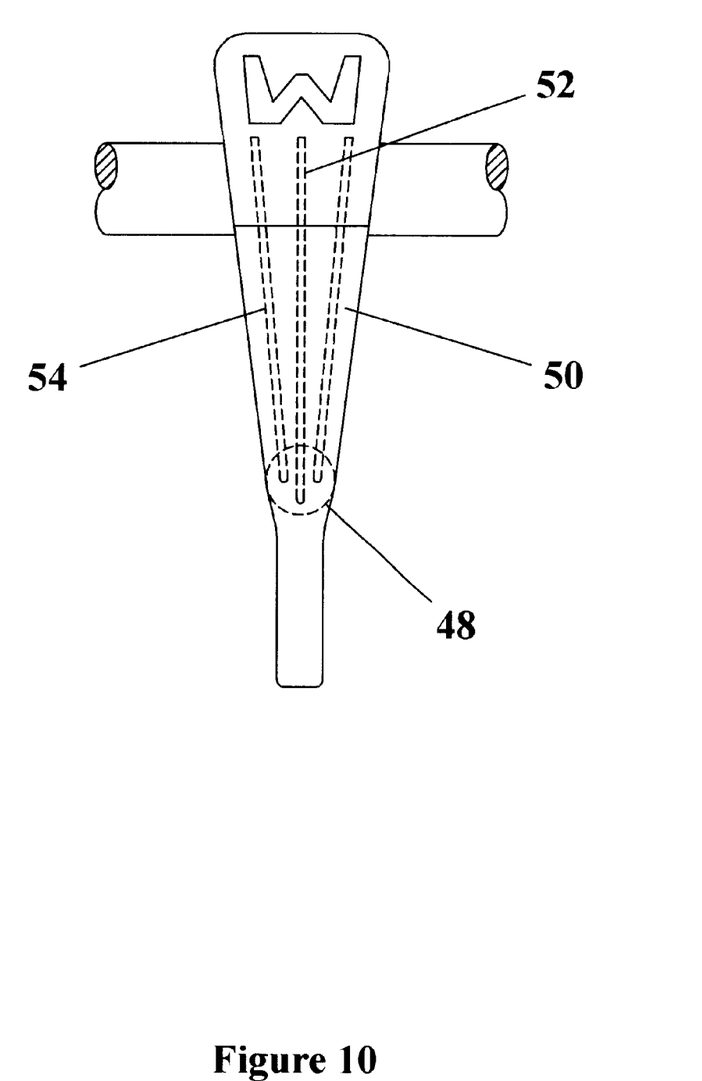
FIG. 10 is a front view of the wedge shaped clip of FIG. 6.

FIG. 9 shows the V shaped member 42 for holding the eyeglass arm 16 in place by engaging the serrated teeth against the arm 16. The V-shaped member shown in FIGS. 8, 9, and FIG. 10 has a wedge shape. For providing more support to the holding of the arm V shaped member 42 may further comprise a resilient wedge pad 48 further supported by a plurality of resilient wedge bars 50, 52, 54 for providing more pressure enabling a more secure grip on the eye glass arm into the hat.

III. The Non-Removable Holder

Figure 11:
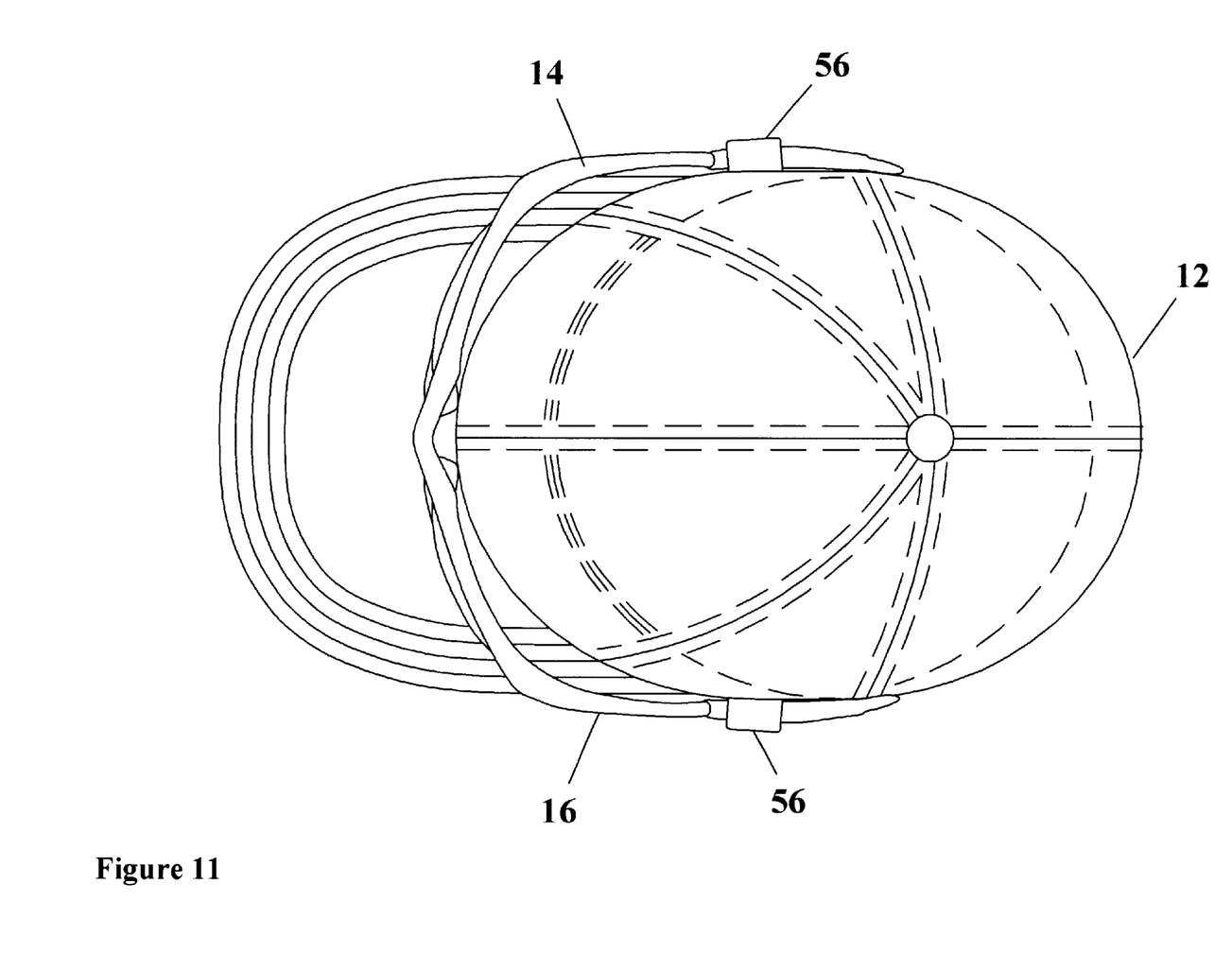
FIG. 11 is a top view of a fastener for securing glasses, with the glasses secured.

A third embodiment of the invention involves a non-removable holder which is secured to the inside of the hat and a strip that slides around the arm of the eyeglasses. FIG. 11 shows a top view of the non-removable holder 56 secured to hat 12 holding eyeglass arms 14 and 16.

Figure 12:
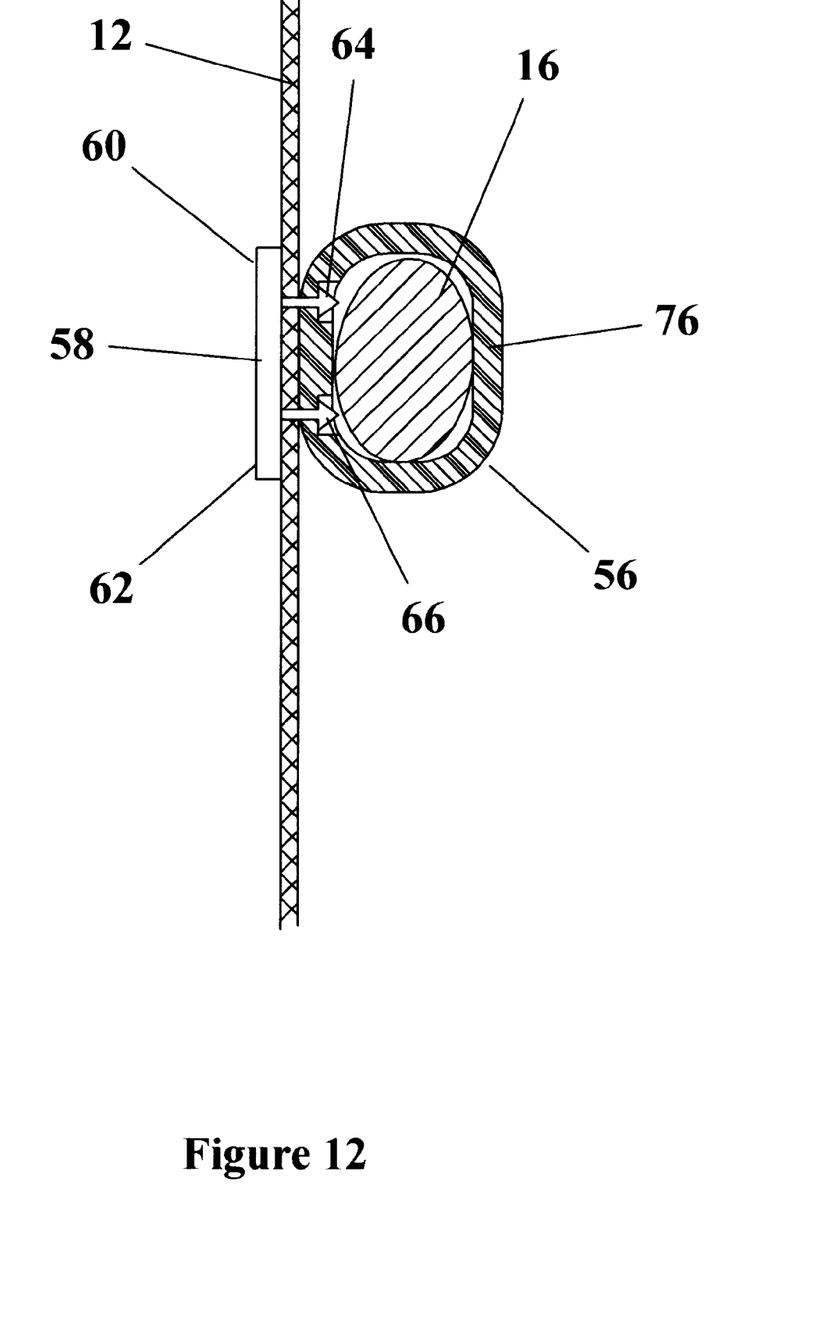
FIG. 12 is a cross sectional view of the fastener of FIG. 11 with the glasses arm in place.

As shown in the cross-sectional view provided in FIG. 12, the holder 56, has a frame 58 secured to the inside of a hat 12 having an upper end 60 and a lower end 62. In one embodiment, of the non-removable holder a pair of elastic cords can be used. For example, as shown in FIG. 12, a first elastic cord 64 extends from the upper end 60. A second elastic cord 66, extends from lower end 62.

Figure 13:
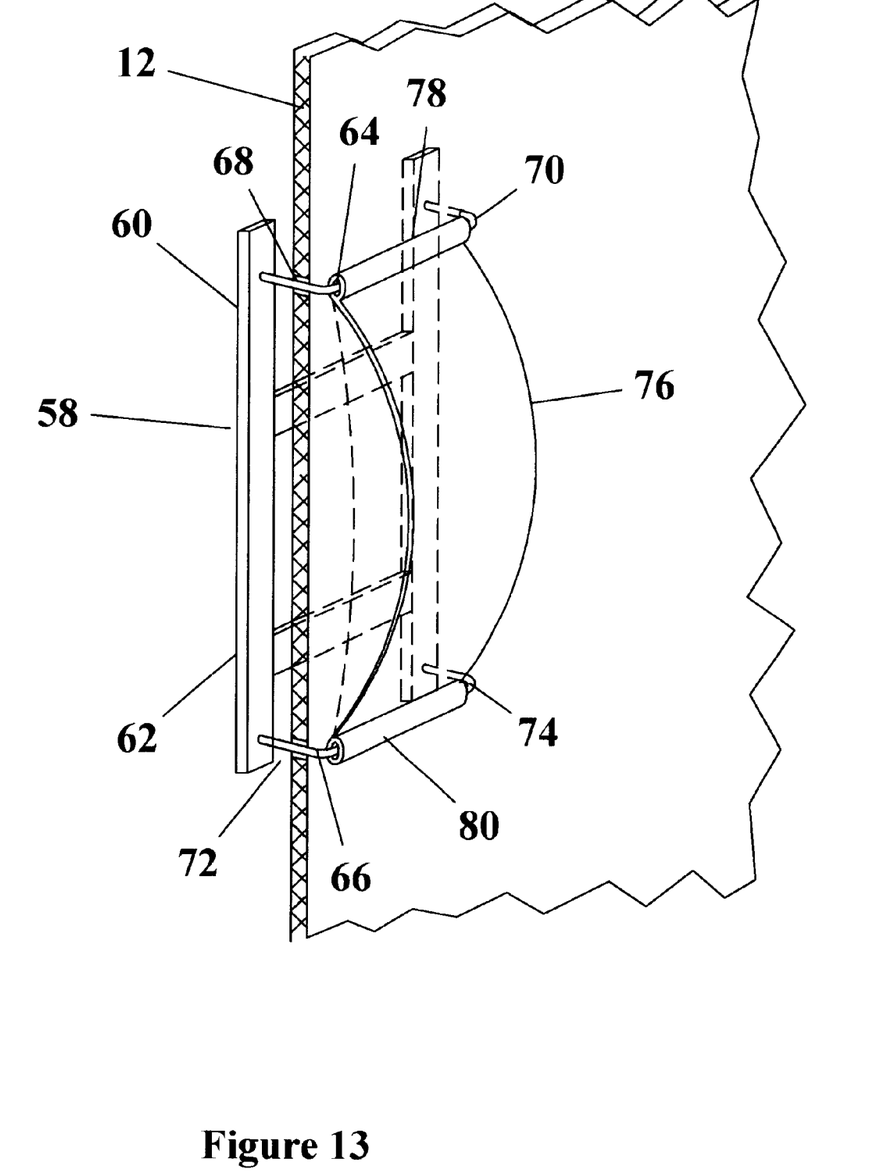
FIG. 13 is a perspective view of another embodiment of the fastener of FIG. 11 without the glasses.

As shown in better detail in FIG. 13, cord 64 has a first end 68 and second end 70 with each end penetrating the fabric of the hat from the outside of said hat and secured to the upper end 60 of the frame 58. The second elastic cord 66 has a first attaching end 72 and a second attaching end 74 with each attaching end penetrating the fabric of the hat from the outside of the hat and secured to the lower end 62 of the frame 58.

A strip 76, shown in both FIGS. 13 and 12 is disposed on the outside of the hat for engaging the arm 16 of the safety or eyeglasses. Preferably this strip 76 has a first strip end 78 and a second strip end 80 wherein the first strip end 78 is secured to the first elastic cord 64 and the second strip end 80 is secured to the second elastic cord 66. One of the advantages of this embodiment, is that all possible diameters of eyeglass legs can be used.

The strip 76, like the wedge shaped clip is preferably made from plastic, or optionally from a lightweight metal alloy or composite of plastic and metal alloy which is preferably between 0.005–0.5 inches thick. In the presently preferred embodiment the strip thickness is approximately 0.05 inches thick.

The strip length is preferably selected to provide an aperture of approximately 3/16-inch thick to hold the arm of the eyeglasses.

In a second embodiment of this non-removable holder, two pins can project from the frame to the strip 76. Foam can be disposed on the side of strip 76 which faces the hat, enabling the eyeglass arms to snugly and securely fit on the hat.

These clips and holders can be used on a variety of hats, such as baseball hats, hard hats, ski hats, and even scuba hoods. Any of a variety of hats can be used within the scope of this invention, soft hats, hats with hard brims, hat without brims, and hats with partial brims.

As will be apparent to those of ordinary skill in the art, various modifications or enhancements of the invention may be implemented without departing from the broader spirit and scope of the invention as described herein.

What is claimed is:

1. A clip attachable to a hat for supporting and securing eye glasses having at least one arm, comprising:
   a clip removably engageable with a hat, wherein said clip comprises:
   a. substantially planar member for smoothly fitting inside a hat;
   b. a U-shaped member extending normally from the substantially planar member inside the hat further comprising serrated teeth, wherein said U-shaped member forms an aperture for engaging the hat material; and
   c. a C-shaped member extending from the U-shaped member, wherein said C-shaped member forms a second aperture for engaging the arm of the eyeglasses and further comprising an insert disposed in the C-shaped member for resiliently engaging the arm of the eyeglasses.

2. The clip of claim 1, wherein the insert is selected from the group consisting of soft foam or soft plastic.

3. A clip attachable to a hat for supporting and securing eye glasses having at least one arm, comprising:
   a clip removably engageable with a hat, wherein said clip comprises:
   a substantially planar member for smoothly fitting inside a hat;
   a U-shaped member extending normally from the substantially planar member inside the hat further comprising serrated teeth, wherein said U-shaped member forms an aperture for engaging the hat material; and
   a C-shaped member extending from the U-shaped member, wherein said C-shaped member forms a second aperture for engaging the arm of the eyeglasses and wherein the C-shaped member further comprises an internal wire to add resistance for holding the glasses to the hat.

4. A clip attachable to a hat for supporting and securing eye glasses having at least one arm, comprising:
   a clip removably engageable with a hat, wherein said clip comprises:
   a substantially planar member for smoothly fitting inside a hat;
   a U-shaped member extending normally from the substantially planar member inside the hat further comprising serrated teeth, wherein said U-shaped member forms an aperture for engaging the hat material; and
   a C-shaped member extending from the U-shaped member, wherein said C-shaped member forms a second aperture for engaging the arm of the eyeglasses and wherein the clip further comprises an internal wire extending through the planar member, U-shaped member and C-shaped member to add resistance for holding the glasses to the hat.

5. A wedge-shaped fastener for holding eye glasses having at east one arm, comprising:
   a planar member for smoothly fitting inside a hat;
   a U-shaped member extending normally from the planar member forming an aperture for engaging the hat; and
   a V-shaped member extending from the U-shaped member, wherein the V-shaped member further comprises a set of serrated teeth for resiliently engaging the arm of said eyeglasses, further comprising an insert disposed in the V-shaped member for resiliently engaging the arm of the eyeglasses.

6. The wedge shaped fastener of claim 5, wherein said insert is comprised of foam.

7. A wedge-shaped fastener for holding eye glasses having at least one arm, comprising:
   a planar member for smoothly fitting inside a hat;
   a U-shaped member extending normally from the planar member forming an aperture for engaging the hat; and
   a V-shaped member extending from the U-shaped member, wherein the V-shaped member further comprises a set of serrated teeth for resiliently engaging the arm of said eyeglasses, further comprising a release lever disposed n an outer surface of said V-shaped member for releasing an engaged arm.

8. A wedge-shaped fastener for holding eye glasses having at least one arm, comprising:
   a planar member for smoothly fitting inside a hat;
   a U-shaped member extending normally from the planar member forming an aperture for engaging the hat; and
   a V-shaped member extending from the U-shaped member, wherein the V-shaped member further comprises a set of serrated teeth for resiliently engaging the arm of said eyeglasses, wherein said V-shaped member further comprises a wedge pad having a plurality of integrally connected wedge bars for additional resiliently holding the arm into the teeth.

9. A fastener for holding eye glasses, comprising:
   a frame secured to the inside of a hat having an upper end and a lower end;
   a first elastic cord having a first and second end with each end penetrating said hat from the outside of said hat and secured to said upper end, and a second elastic cord having a first attaching end and a second attaching end with each attaching end penetrating said hat from the outside of said hat and secured to said lower end; and
   a strip disposed on the outside of said hat for engaging an arm of a pair of eye glasses, wherein said strip has a first strip end and a second strip end, wherein said first strip end is secured to said first elastic cord and said second strip end is secured to said second elastic cord.

10. The fastener of claim 9, wherein said eyeglasses are selected from the group: sun glasses, safety glasses, reading glasses and prescription glasses.

11. The fastener of claim 9, further comprising an insert disposed on the side of the strip facing the hat for resiliently engaging the arm of the eyeglasses.

12. The fastener of claim 11, wherein said insert is comprised of foam.

13. A fastener for holding eye glasses, comprising:
   a frame secured to the inside of a hat having an upper end and a lower end;
   at least one first pin having a first and second end with each end penetrating said hat from the outside of said hat and secured to said upper end, and at least one second pin having a first attaching end and a second attaching end with each attaching end penetrating said hat from the outside of said hat and secured to said lower end; and a strip disposed on the outside of said hat for engaging an arm of a pair of eye glasses, wherein said strip has a first strip end and a second strip end, wherein said first strip end is secured to said first pin and said second strip end is secured to said second pin.

14. The fastener of claim 13, wherein said eyeglasses are selected from the group: sun glasses, safety glasses, reading glasses and prescription glasses.

15. The fastener of claim 13, further comprising an insert disposed on the side of the strip facing the hat for resiliently engaging the arm of the eyeglasss.

16. The fastener of claim 13, wherein an insert is comprised of foam.

* * * * *